United States Patent [19]

Mukasa

[11] 4,367,914
[45] Jan. 11, 1983

[54] MICROSCOPE EQUIPPED WITH A MICRO MANIPULATOR

[75] Inventor: Shizuo Mukasa, Hachiouji, Japan
[73] Assignee: Olympus Optical Co., Ltd., Tokyo, Japan
[21] Appl. No.: 210,530
[22] Filed: Nov. 25, 1980
[30] Foreign Application Priority Data Nov. 29, 1979 [JP] Japan .......................... 54/164294[U]

[51] Int. Cl.³ ............................................ G02B 21/32
[52] U.S. Cl. .................................................. 350/530
[58] Field of Search ............................................ 350/81

[56] References Cited

U.S. PATENT DOCUMENTS 3,438,690 4/1969 Skerman ................................ 350/81
3,765,744 10/1973 Van Noord et al. .
4,270,838 6/1981 Furusawa et al. ...................... 350/81

Primary Examiner—John K. Corbin
Assistant Examiner—Matthew W. Koren
Attorney, Agent, or Firm—Cushman, Darby & Cushman

[57] ABSTRACT

A microscope equipped with a micro manipulator comprising a pipe for setting a needle therein, a pipe holder for holding said pipe, a condenser lens having a run-through slot formed along the optical axis for passing a needle therethrough and a condenser lens holder for holding said condenser lens, said pipe holder being so constructed as to be shifted for a definite distance along the optical axis and thereafter rotatable, and said pipe holder and condenser lens holder being so constructed as to be shiftable for a definite distance along the optical axis and thereafter rotatable integrally, whereby needles and culture dishes on the stage can easily be exchanged with others.

3 Claims, 7 Drawing Figures

4,367,914

MICROSCOPE EQUIPPED WITH A MICRO MANIPULATOR

BACKGROUND OF THE INVENTION (a) Field of the Invention

The present invention relates to a microscope equipped with a micro manipulator so adapted as to facilitate exchange of specimens, needles and so on.

(b) Description of the Prior Art

There have conventionally been known microscopes equipped with micro manipulators having injection needles or electrode needles which are used for shifting specimens or injecting liquids to treat specimens kept in culture dishes. There have also been known microscopes equipped with micro manipulators which are so adapted as to move said injection needles or electrode needles along the optical axis. These microscopes equipped with micro manipulators comprise a condenser lens through which a run-through slot is formed along the optical axis and a pipe is fitted into said slot for setting the injection needle or electrode needle therein. Since these microscopes equipped with micro manipulators were so designed as to exchange the needles through upward movement thereof only, said needles must be raised upward until they are apart sufficiently from the condenser lens for exchanging the needle with another. Therefore, these microscopes had defects that they required large mechanisms for moving the needles vertically and could not assure desirable operability.

SUMMARY OF THE INVENTION

A primary object of the present invention is to provide a microscope equipped with a micromanipulator comprising a pipe for setting a needle, a pipe holder for retaining said pipe and a condenser lens having a run-through slot for inserting said needle, said pipe holder being so constructed as to be shiftable for a definite distance along the optical axis and then rotatable on a plane perpendicular to the optical axis, whereby said microscope makes it possible to easily exchange a needle with another simply by short shifting of said pipe holder along the optical axis.

Another object of the present invention is to provide a microscope equipped with a micro manipulator constructed in such a manner that said pipe holder and a condenser lens holder for holding said condenser lens are shiftable as a unit along the optical axis and, after shifting them for a definite distance along the optical axis, said pipe holder and condenser lens holder are rotatable as a unit, whereby making it possible to facilitate to exchange culture dishes and so on.

DETAILED DESCRIPTION OF THE PREFERRED EMBODIMENTS

Figure 1:
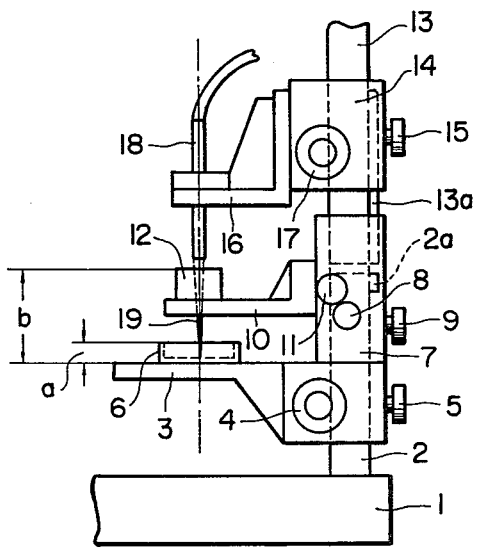
FIG. 1 shows a side view illustrating construction of a first embodiment of the microscope equipped with the micro manipulator according to the present invention.

Now, the microscope equipped with the micro manipulator according to the present invention will be described more detailedly with reference to the accompanying drawings. A first embodiment of the microscope equipped with the micro manipulator is illustrated in FIG. 1 wherein the reference numeral 1 represents a base of the microscope, the reference numeral 2 designates a lower support having a key 2a and fixed to said base 1, the reference numeral 3 denotes a stage which is fitted into the lower support 2 so as to be vertically movable, the reference numeral 4 represents a handle for moving up and down said stage 3, the reference numeral 5 designates a thumb screw for fixing said stage 3 at a suitable position, the reference numeral 6 denotes a culture dish placed on said stage 3, the reference numeral 7 represents a condenser lens holder which is located above said stage 3 and fitted around said lower support 2 so as to be vertically movable and rotatable, the reference numeral 8 designates a knob to be used for vertically moving and rotating said condenser lens holder, the reference numeral 9 denotes a thumb screw for fixing said condenser lens holder 7 at a suitable position, the reference numeral 10 designates a condenser lens mount attached to said condenser lens holder 7 so as to be vertically movable, the reference numeral 11 represents a handle for moving up and down said condenser lens mount and the reference numeral 12 designates a condenser lens which is detachably arranged on said condenser lens mount and has a run-through slot for accommodating a pipe allowing an injection needle or electrode needle to pass therethrough, these members composing a condenser lens assembly.

Figures 2A, 2B:
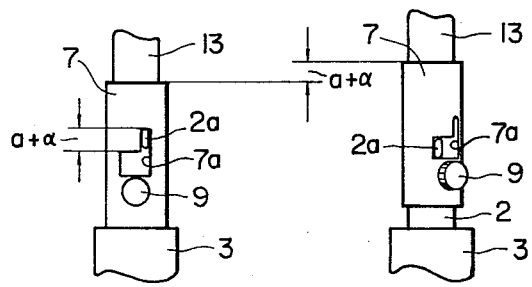
FIG. 2A and FIG. 2B show rear views illustrating the condenser lens holder used in said embodiment of the present invention.

In the condenser lens holder 7 of this condenser lens assembly, there is formed a key way 7a having such a shape as shown in FIG. 2A and FIG. 2B which cooperates with the key 2a formed on the lower support 2 to restrict vertical motion and rotation of the condenser lens holder 7. When said key 2a is located at the position shown in FIG. 2A in said key way 7a, the condenser lens holder 7 is set at its lower position. When said key 2a is located at the position shown in FIG. 2B, the condenser lens 7 is set at its higher position. Shape of the key way 7a is selected in such a manner that the difference in height of the condenser lens holder 7 between the positions shown in FIG. 2A and FIG. 2B is larger than the height of the culture dish 6, i.e., equal to $a + \alpha (\alpha > 0)$.

The reference numeral 13 represents an upper support which is fixed to the top end of the condenser lens holder 7 and has a key 13a, the reference numeral 14 designates a pipe holder fitted into said upper support so as to be movable vertically, the reference numeral 15 denotes a thumb screw for fixing said pipe holder 14 at a suitable position, the reference numeral 16 represents a pipe mount attached to the pipe holder 14 so as to be controllable finely and coarsely with a handle 17, the reference numeral 18 designates a pipe which is held by the pipe mount 16 and used for setting an injection needle or electrode needle, and the reference numeral 19 denotes an injection needle or electrode needle detachably arranged in said pipe 18, these members composing a pipe holder assembly.

Figure 3A:
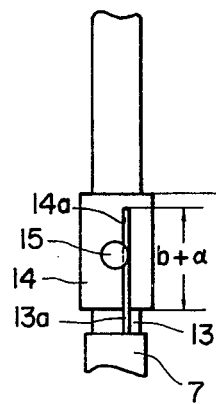
FIG. 3A and FIG. 3B show rear views illustrating the pipe holder used in said embodiment of the present invention.
Figure 3B:
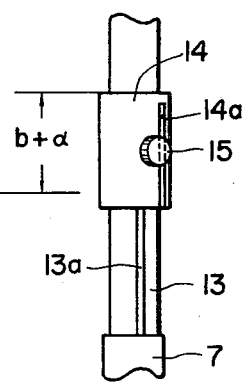

In the pipe holder 14 of this pipe holder assembly, there is formed a key way 14a having such an elongated shape as shown in FIG. 3A and FIG. 3B. When the key 13a of the upper support 13 is fitted in the key way 14a as shown in FIG. 3A, the pipe holder 14 is set at its lower position and its rotation is restricted. When the key way 14a is located at the position shown in FIG. 3B, in contrast, the pipe holder 14 is set at its higher position and in freely rotatable condition. The difference in height of the pipe holder 14 between the positions shown in FIG. 3A and FIG. 3B, i.e., the length of the key way 14a is larger than length b as measured from the top surface of the stage 6 to the top surface of the condenser lens 12, or equal to $b+\alpha(\alpha>0)$.

Now, operations of the microscope equipped with the micro manipulator according to the present invention will be described. In the first place, operation for removing the pipe holder assembly and the condenser lens assembly as a unit for removing or replacing the culture dish 6 from or on the stage 6 will be described. When the thumb screw 9 is loosened and the condenser lens holder 7 is raised while grasping the knob 8, the condenser lens mount 10, condenser lens 12, upper support 13, pipe holder 14, pipe mount 16, pipe 18 and needle 19 are raised as a unit. When the lower end surface of the key way 7a is brought into contact with the lower end of the key 2a, the condenser lens holder 7 is raised for a distance of $a+\alpha$ as described above, at which the tip of the needle 19 does not interfere with the culture dish 6 even by rotating the condenser lens holder 7 by shift the needle 19 horizontally. Therefore, the tip of the needle 19 is not caught by the edge of the culture dish 6 even when the condenser lens holder 7 is rotated to the position shown in FIG. 2B. When the needle 19 is rotated together with the other members as described above, the culture dish 6 can easily be removed or replaced with another.

In the next place, operation to remove the pipe holder assembly only for exchanging the needle with another will be described. First, the thumb screw 15 is loosened. At this stage, the thumb screw 9 is kept in tightened condition and the condenser lens holder 7 is kept fixed to the lower support 2. Then, the pipe mount 14 is raised, whereby the pipe holder 16, pipe 18 and needle 19 are raised as a unit. When the pipe mount 14 is raised until the key 13a is removed from the key way 14a, the pipe holder assembly is raised for a distance of $b+\alpha$, whereby the pipe 18 and needle 19 are pulled out completely out of the run-through slot of the condenser lens 12. When the pipe holder 14 is rotated, for example, to the position shown in FIG. 3B, the pipe holder assembly is removed from above the condenser lens mount 10. The needle 19 is not caught by the condenser lens 12 in this course. Since the needle 19 is shifted to the position apart from the condenser lens 12, as described above etc., the micro manipulator is set in a condition in which the needle 19 can easily be exchanged with another.

The members removed by the above-described operation can be returned to their initial positions by performing the reverse to said operations. At this stage, the needle 19 is automatically reset at its correct position since position of the lens holder 7 is determined by the key 2a and the key way 7a, and position of the pipe holder 14 is determined by the key 13a and key way 14a.

In addition to the operations for exchanging culture dish and needle, etc. with others described above, the microscope equipped with the micro manipulator permits operations for microscopy and so on in the same manner as those for an ordinary microscope. Speaking concretely, the microscope equipped with the micro manipulator permits observing a specimen placed in a culture dish through an inverted type of objective lens and the bottom of the culture dish 6. In case of such microscopy, manipulation of the specimen contained in the culture dish 6, injection of washing liquid and treating solution by means of the injection needle as well as manipulation with an electrode needle are performed. As the objective lens for this microscope equipped with a micro manipulator, it is possible to use an objective lens serving also as a condenser lens in placed of the inverted type of objective lens. That is to say, it is possible to use an objective lens also serving as a condenser lens (having a run-through slot along the optical axis, needless to say) in place of the condenser lens 12. Furthermore, the microscope equipped with the micromanipulator according to the present invention can be used for phase difference microscopy when it is combined with an objective lens equipped with a phase difference device and a condenser lens.

Figure 4A:
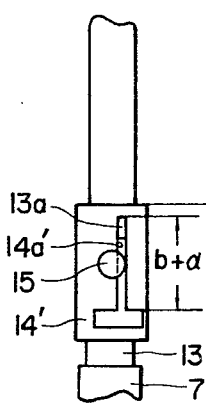
FIG. 4A and FIG. 4B show rear views of the pipe holder used in a second embodiment of the present invention.
Figure 4B:
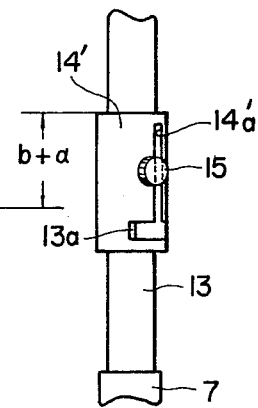

FIG. 4A and FIG. 4B illustrate a second embodiment of the present invention in which a pipe holder 14' has a key way 14'a modified in its shape. Speaking concretely, the key way 14'a has such a shape as to restrict rotatable range of the pipe holder in this embodiment.

The key way can have any desired shape so far as its vertical length is longer than $b+\alpha$ which is sufficient to allow the tip of the needle to be removed from the run-through slot in the condenser lens or $a+\alpha$ which is sufficient for raising the tip of the needler higher than height of the culture dish.

As is understood from the foregoing descriptions, the microscope equipped with the micro manipulator according to the present invention has such a construction that permits removing the pipe holder assembly independently or the pipe holder assembly together with the condenser lens holder assembly with a single operation, thereby facilitating to exchange needles and culture dishes containing specimens with others and being very convenient for practical use. The microscope equipped with the micro manipulator according to the present invention has another merit that the individual members are automatically reset at their correct positions when the removed members are returned to their initial positions.

I claim:

1. A microscope including a base and being equipped with a micro manipulator comprising a pipe for setting a needle detachably, a pipe holder assembly for holding said pipe, and a condenser lens assembly located below said pipe holder assembly and having a run-through slot allowing said needle to pass therethrough, a lower support erected on a base of said microscope and an upper support fixed to said condenser lens assembly, said condenser lens assembly being shiftably and rotatably mounted on said lower support, and said pipe holder assembly being shiftably and rotatably mounted on said upper support.

2. A microscope equipped with a micro manipulator according to claim 1 wherein said condenser lens assembly comprises a condenser lens holder shiftably and rotatably mounted on said lower support, a condenser lens mount slidably attached to said condenser lens holder and a condenser lens which is detachably held by said condener lens mount and has said run-through slot formed along the optical axis.

3. A microscope equipped with a micro manipulator according to claim 2 wherein said pipe holder assembly comprises a pipe holder shiftably and rotatably mounted on said upper support, said pipe set in said pipe holder and said needle fitted in said pipe.

* * * * *